United States Patent
Woltjen

[15] 3,636,783
[45] Jan. 25, 1972

[54] FLEXIBLE BELT CARRIER MECHANISM

[72] Inventor: Duane W. Woltjen, Manchester, Mo.
[73] Assignee: UMC Industries, Inc., St. Louis, Mo.
[22] Filed: Feb. 16, 1971
[21] Appl. No.: 115,258

Related U.S. Application Data
[62] Division of Ser. No. 884,511, Dec. 12, 1969.

[52] U.S. Cl. .............................. 74/229, 74/231 C, 74/231 J, 74/231 M, 74/235, 74/250 C
[51] Int. Cl. ..................... F16h 7/02, F16g 7/00, F16g 13/02
[58] Field of Search ................ 74/229, 231 C, 231 M, 250 C, 74/231 J, 235

[56] References Cited

UNITED STATES PATENTS

| | | | |
|---|---|---|---|
| 842,611 | 1/1907 | Bell | 74/231 C |
| 2,357,718 | 9/1944 | Fleckenstein | 74/231 C |
| 3,394,794 | 7/1968 | Styles | 74/231 C X |

*Primary Examiner*—Leonard H. Gerin
*Attorney*—Koenig, Senniger, Powers & Leavitt

[57] ABSTRACT

Rigid connectors between adjacent portions of flexible belt elements are fastened thereto in such a manner that when the belt flexes as it moves over supporting drums bending stresses are avoided at the fastenings. The flexible belt may be of segmental or continuous form. The connectors may be in the form of carrier plates employed to carry pieces to be worked upon during the movements of the connectors, or the connectors may be of a form or carry means to push unattached objects. In either case, movements may be continuous or intermittent. In cases in which the connectors are massive or carry massive parts, means are provided to prevent inertial oscillations during changes from translatory to angular movements of the connectors.

7 Claims, 14 Drawing Figures

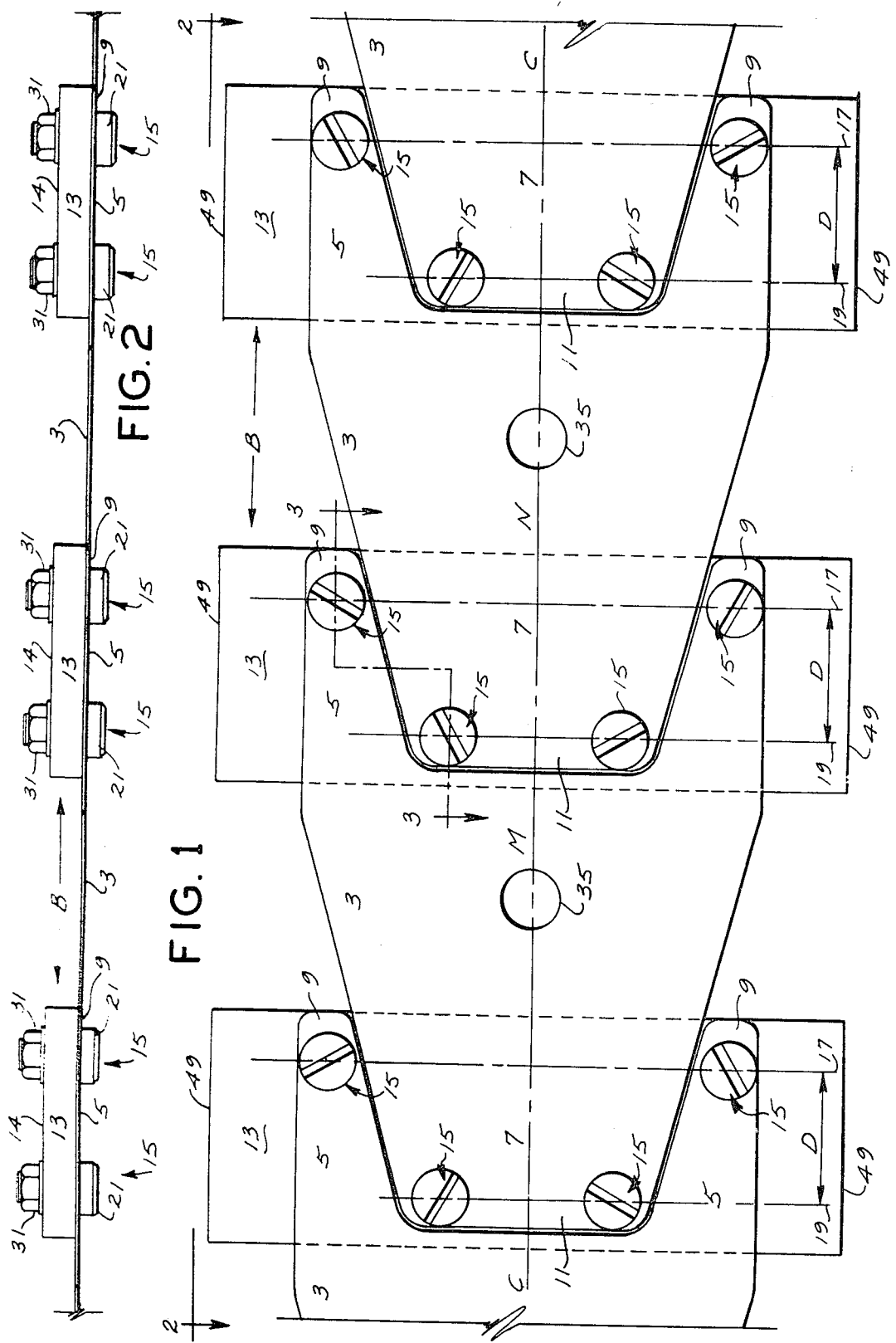

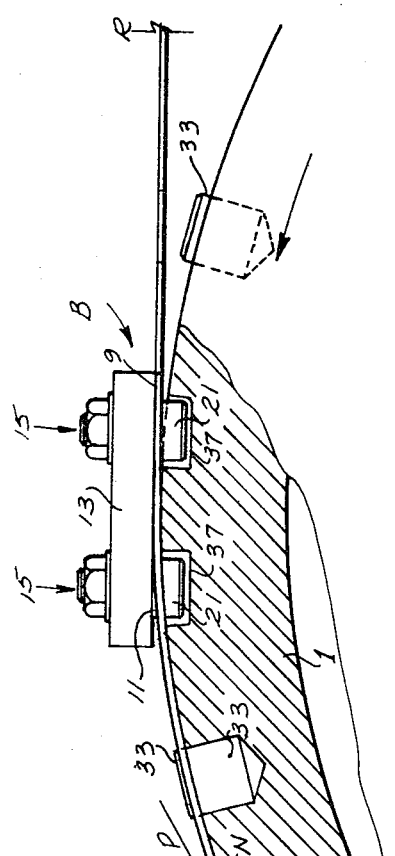
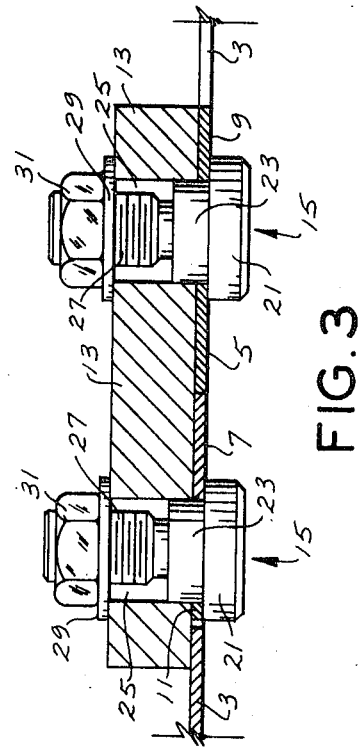
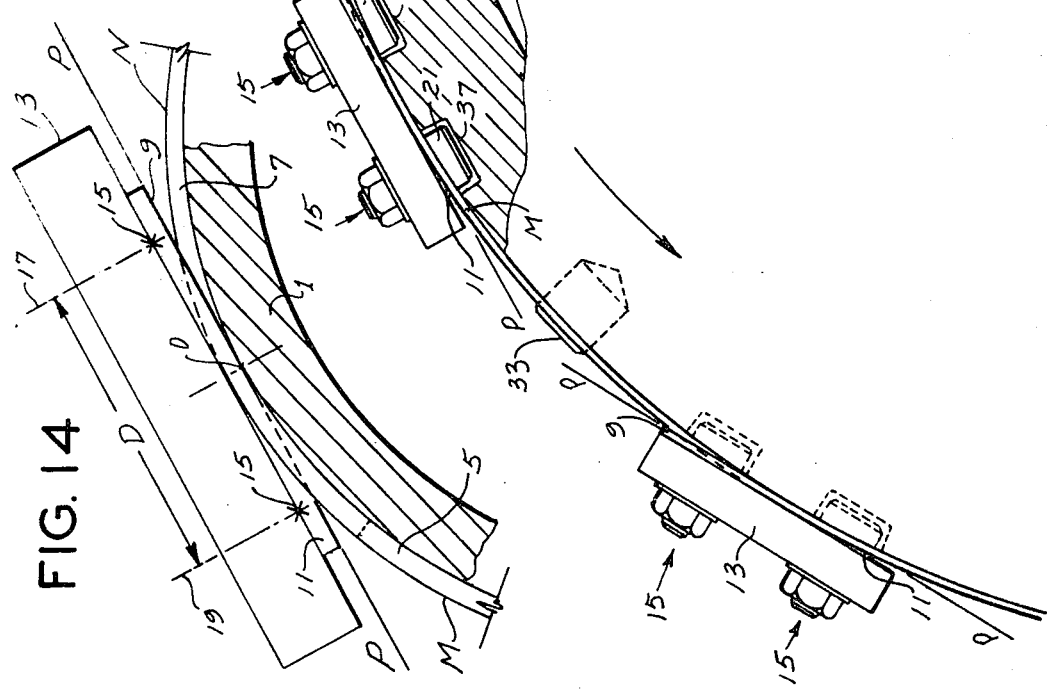
FIG. 3
FIG. 4
FIG. 14

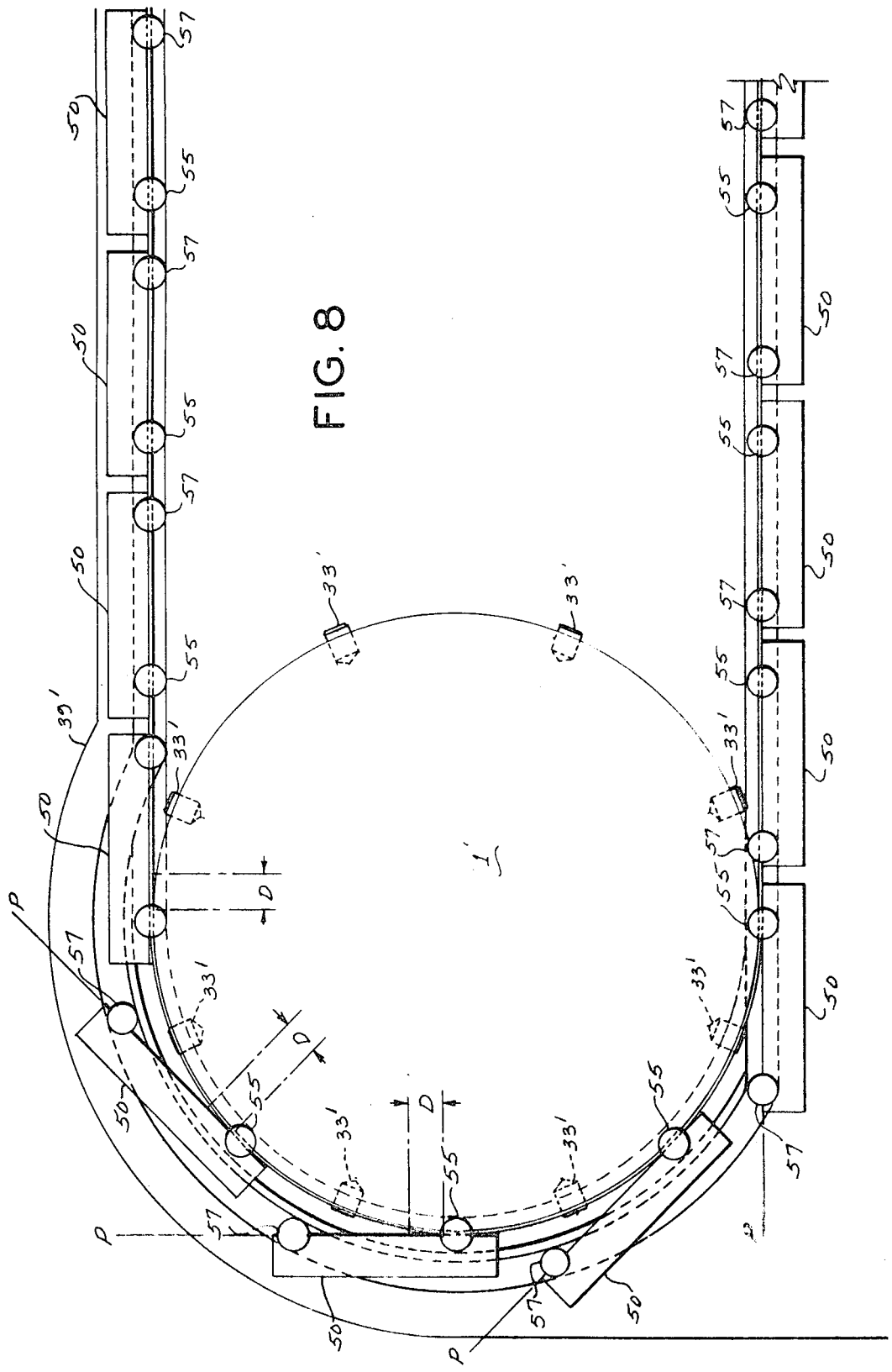

3,636,783

1

FLEXIBLE BELT CARRIER MECHANISM

CROSS-REFERENCE TO RELATED APPLICATION

This application is a division of my copending application Ser. No. 884,511, filed Dec. 12, 1969.

BACKGROUND OF THE INVENTION

It has been known to mount carrier plates on endless flexible flat belts, the latter being supported on and moved by drums (see for example U.S. Pat. No. 3,379,298). The manner in which the plates have heretofore been fastened to the belts, particularly when the latter were composed of metal, was not entirely satisfactory, because of high-bending stresses generated at fastenings when the belt was flexed, as during movement over a supporting drum. This shortened operating life of the belt. In some such devices undesirable oscillations of the connectors may occur in approach and recessive movements to and from a drum, particularly when the plates are heavy or carry heavy workpieces. These oscillations if considerable should be avoided.

SUMMARY

The invention eliminates the difficulties above referred to by forming adjacent portions of a flexible belt to include extensions which overlap or interdigitate in the plane of the belt so that the distal ends of the extensions are spaced along the belt length. The rigid member to be supported is then fastened to such distal ends of the extensions. Thus the fastening means between the extensions and the rigid member are caused always to lie in a plane, regardless of whether the connector at a particular time is located in a flat reach of the belt between drums, or in a curved portion of the belt on a drum. When the fastenings are between parts which remain coplanar, rather than one part being bent away from the other at the point of fastenings, any bending stresses at the fastenings are avoided. Oscillations which may occur are also prevented. According to the invention the fastenings between the work-carrying connectors and flexible portions may be made quite tight for high-positional accuracy of the workpieces which they carry; whereas heretofore if bending stresses at the fastenings were to be avoided, looseness at the fastenings was called for, with resulting low-positional accuracy.

BRIEF DESCRIPTION OF THE DRAWINGS

FIG. 1 is a face view of a first form of belt per se made according to the invention;

FIG. 2 is an edge view sighted across line 2—2 on FIG. 1;

FIG. 3 is an enlarged cross section taken on line 3—3 of FIG. 1 showing details of certain fasteners;

FIG. 4 is a view, partly in elevation and partly in section, illustrating improved action of the belt of FIGS. 1 and 2 when supported on a drum;

FIGS. 8, 9 and 10 are fragmentary side, plan and end views corresponding to the views in FIGS. 5, 6 and 7, respectively, but illustrating another form of the invention, parts being broken away;

FIG. 14 is a skeleton diagram illustrating certain of the basic features of the invention.

Corresponding reference characters indicate corresponding parts throughout the several views of the drawings.

DESCRIPTION OF THE EMBODIMENTS OF THE INVENTION

Figure 5:
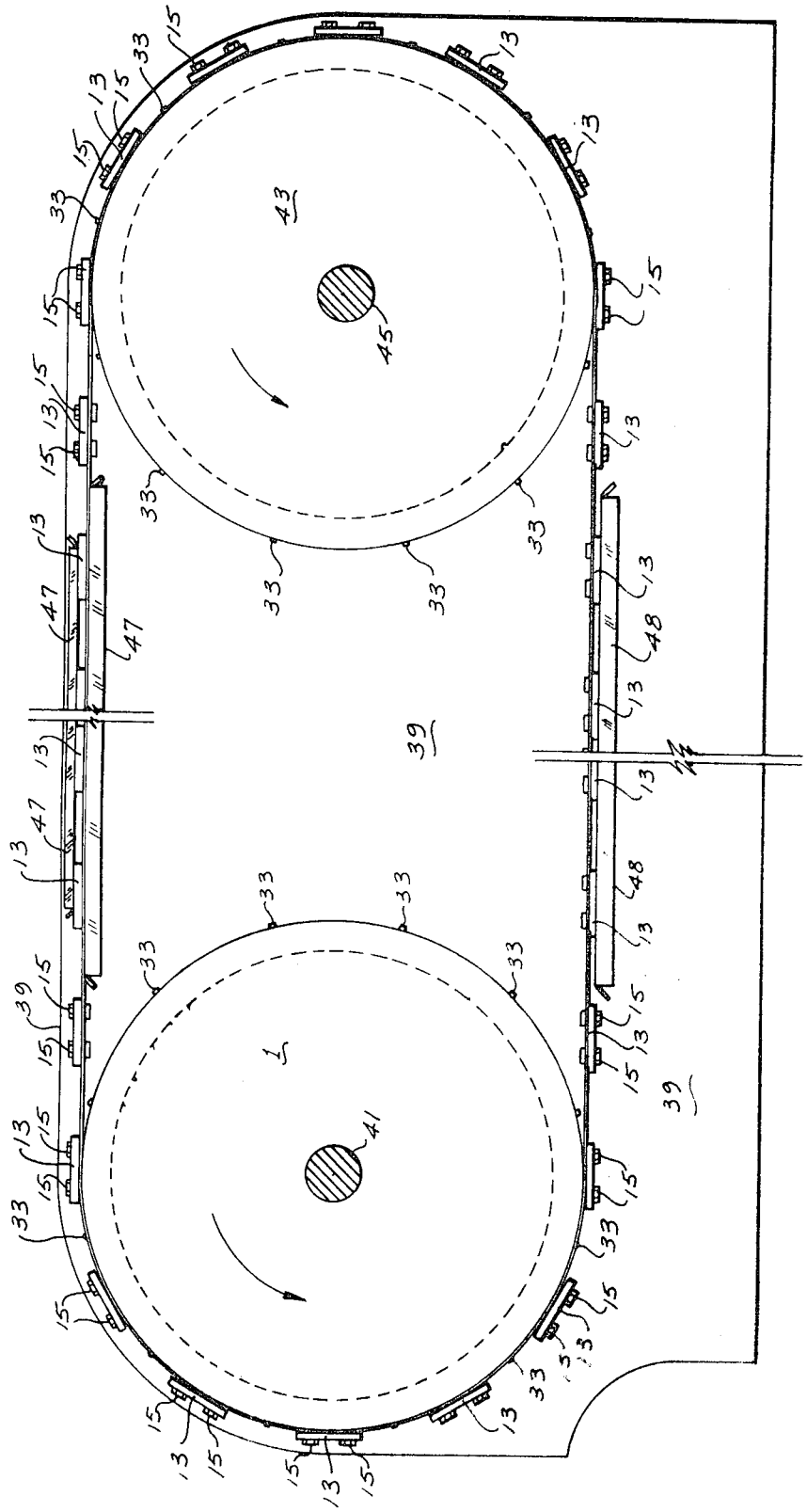
FIG. 5 is a side view of a mechanism employing the belt of FIGS. 1-4.
Figure 9:
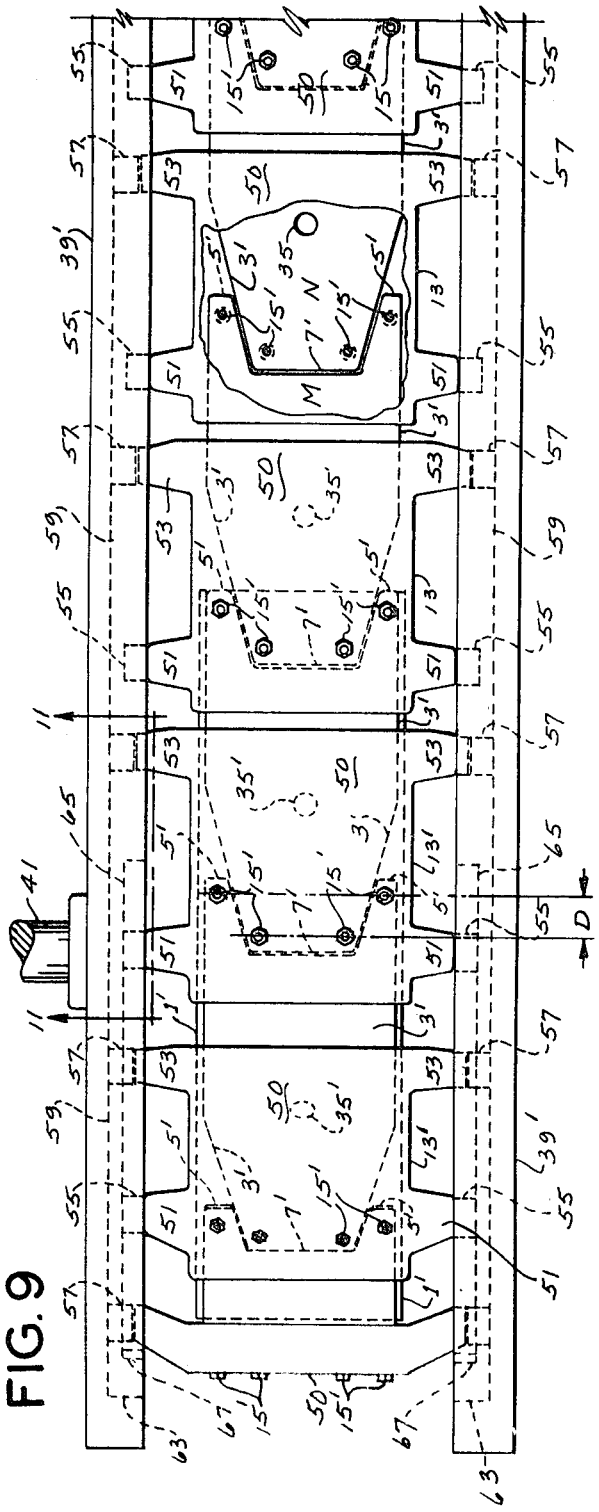

Hereinafter the term "connector" has the significance of a rigid part such as of metal which either carries workpieces or the like in order to carry them from place to place, or which may be formed or have attached thereto means for engaging external objects to move them. In the first and second forms of the invention (FIGS. 1–11) the connector forms the sole connection between adjacent end portions of adjacent links; in the third form of the invention (FIG. 12) the connector forms the sole connection between adjacent end portions of a continuous belt having two ends; and in the fourth form of the invention (FIG. 13) the connector forms an auxiliary connection (not the sole connection) between adjacent portions of a continuous and endless belt. Rigid connectors made according to the invention may take a wide variety of forms, depending upon particular applications. In all forms of the invention the belt material, aside from the connectors, is composed of thin flexible sheet material such as spring steel but may be made of other appropriate flexible sheet material.

Referring to the first form of the invention illustrated in FIGS. 1–7, numeral 1 indicates a drum, shown partially in section in FIG. 4, around which is carried a belt indicated generally by the letter B. This belt is made of thin flexible links 3, composed for example and without limitation of 0.016 inch (27 U.S. gage) cold-rolled SAE 1,074 soft annealed spring steel stock. The thickness depends upon the mechanical strength required of a link in a given application but should not be so great as to interfere with the required flexibility for curved engagement with drum 1 by bending and return to a flat condition upon disengagement.

Opposite end portions of each link 3 form extensions such as fingers 5 at the right end and a tongue 7 at the left end. The links are paired in end-to-end relationships, such that the distal ends 9 of fingers 5 of one link interdigitate with the distal ends 11 of a tongue 7 of an adjacent link, the interdigitation being in the plane of the belt when flat. This interdigitation of the fingers 5 and the tongue 7 is such as to space apart their respective distal ends a distance D between lines 17 and 19 in the direction of the belt length. Lines 17 and 19 are perpendicular to the center line C—C of the belt B.

Numerals 13 indicate rigid connections of rectangular form to the faces 14 of which (FIG. 2) workpieces, lugs or the like may be fastened by conventional means (not shown). These are to be moved either continuously or intermittently, as desired. Or, these connectors may in and of themselves be shaped on said faces 14 with projections for pushing along unconnected objects. In any event, each connector 13 is held to the distal ends 9 of a pair of fingers 5 of one link 3 by one pair of screw fasteners 15 on line 17. Connector 13 is also held to the distal end 11 of tongue 7 of an adjacent link 3 by another pair of like fasteners 15 on link 19. Thus the two pairs of fastenings 15 are spaced apart the distance D.

Each fastener 15 is constituted by a shoulder forming head 21 which seats upon what is to become the inside of a link 3 (FIG. 3). Cylindrical portions 23 closely fit into coaxial holes of equal diameters in the links 3 and in the connectors 13. The holes in connectors 13 are shown at 25. Extending from the cylindrical portions 23 are threaded shanks 27 for the acceptance of washers 29 and nuts 31. Thus it will be seen that by tightening nuts 31, rigid fastenings are accomplished between each connector 13 and an abutted pair of the links 3. It is such rigid fastenings that heretofore would have caused trouble when connectors moved over a drum thereby engendering high-local bending stresses at the fastenings with shortened belt life. Former provision of play at the fasteners to relieve the stresses was not a satisfactory solution because of the resulting looseness of the connectors.

Referring to FIG. 4 it will be seen how bending stresses are avoided with tight fastenings 15. The drum 1 carries dowel pins 33 which are engageable with holes 35 formed through the links 3 in order to obtain a positive drive. The drum 1 is provided with recesses 37 for accepting the heads 21 of the fasteners 15. As the belt B approaches the drum, say from the right as illustrated, the inside surfaces of the distal ends 9 and 11 of the fingers 5 and the tongue 7 respectively remain in the flat inside plane of the belt B along its straight reach R. The rigidity of the connectors 13 permanently holds the inside surfaces of the interdigitated distal portions 9 and 11 in the same plane. This state of affairs is maintained even after the connectors 13 take up positions around the drum 1 as illustrated at the left in FIG. 4. Thus the inside surfaces of said fastened distal ends are always coplanar and the plane is tangent to the drum surface (see planes P—P). Thus there is never any bent condition in any of the links 3 at a fastener 15 and hence there are no bending stresses at the points of attachment between the connectors 13 and the links 3. While tangency between planes P—P and the drum 1 is illustrated in FIG. 4 as bisecting the distance D, such bisection is not a necessary condition. In other words the connectors 13 and planes P—P may rock with respect to the drum surface so as to shift the points of tangency of planes P—P within the range D. However, a coplanar relationship between distal ends 9 and 11 of the fingers 5 and tongues 7 is maintained. Such rocking may occur under inertial vibration of heavy parts carried on the connectors 13 but is ordinarily not enough to make plane P—P tangent to the drum at or near either line 17 or 19.

Figure 6:
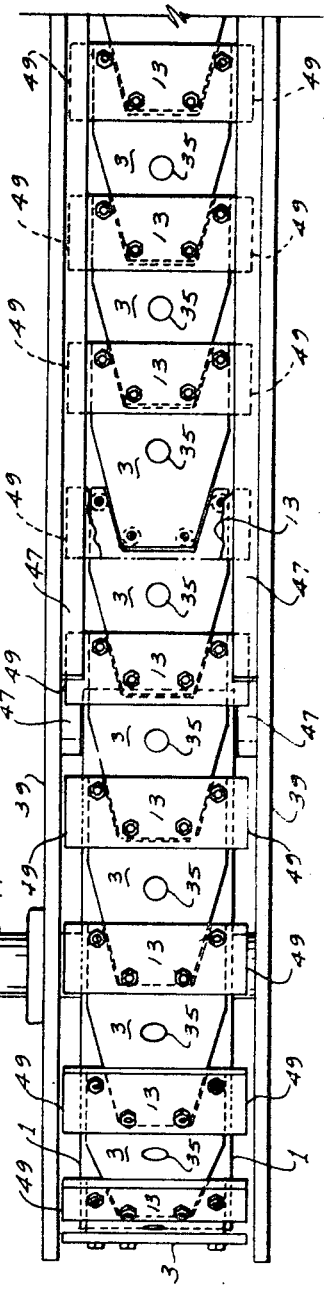
FIG. 6 is a fragmentary plan view of FIG. 5.
Figure 10:
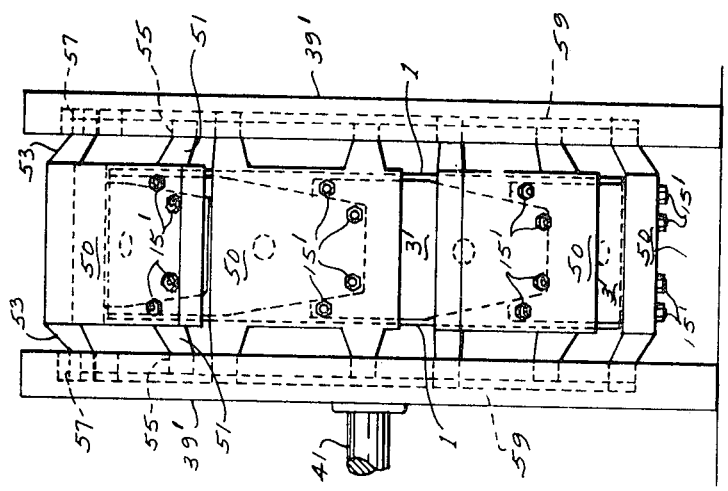
Figure 7:
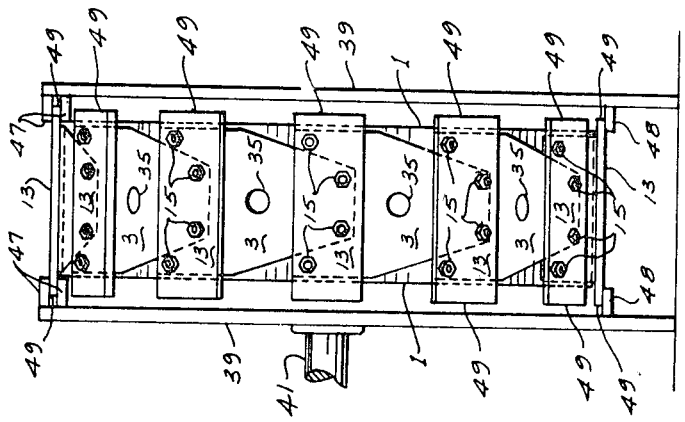
FIG. 7 is a left-end view of FIG. 5.
Figure 11:
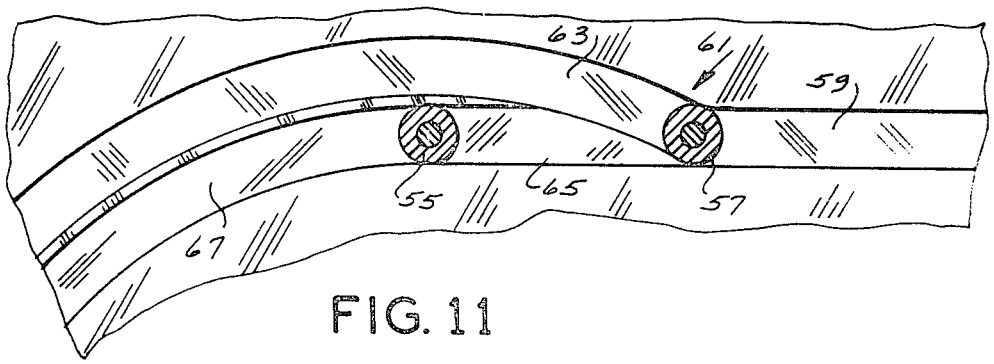
FIG. 11 is an enlarged detailed cross section taken on line 11—11 of FIG. 9.

FIGS. 5–7 illustrate apparatus employing the belt of FIGS. 1–4. This comprises side plates 39 for supporting the driving drum 1 on a drive shaft 41 and an idler drum 43 on a shaft 45. The drum 43 is constructed like the drum 1, except that it is not power driven. Its shaft 45 may be adjusted relative to shaft 1 by conventional means (not shown) for belt tensioning purposes. Drive means for the drive shaft 41 is not shown since various drives for the purpose are known, such as continuous drives, intermittent motion drives, etc.

In order to prevent sag in the reaches of the belt between the drums 1 and 43, there are provided inwardly extending spaced upper tracks 47 above and below the upper reach and lower track 48 below the lower reach. Sidewise projections 49 of the connectors 13 travel between the upper tracks 47, being thus accurately held in one plane of movement in the upper reach. Likewise, the projections 49 riding on track 48 hold the belt in a plane in its lower reach.

Referring to FIGS. 8–11, these have been made fragmentary to provide for sufficient enlargement to show certain details. They illustrate modifications wherein primed index numbers indicate like functioning parts to those indexed with corresponding unprimed numbers in FIGS. 1–7, although they may be of somewhat different shape, as hereinafter pointed out. The modified structure comprises flexible links 3' having tongues 7' interdigitated with fingers 5' on adjacent links 3'. These links 3' include holes 35' engaged by dowel pins 33' on a driving drum 1' having drive shaft 41'. An idler drum corresponding to idler drum 43 in FIGS. 1–7 is not shown. In the modification (FIGS. 8–10) the connectors are indicated at 50. These connectors 50 are larger and more massive than the corresponding connectors 49 shown in FIGS. 5–7. This is for the purpose of receiving heavier workpieces, such as are responsible for the greater tendency for the connectors to oscillate as they transfer from straight line motion to circular motion as a drum is approached or from circular to straight line motion upon leaving a drum. Screw fasteners 15' (like 15 shown in FIG. 3) rigidly join each connector 50 with the distal ends of the interdigitated fingers 5' and tongue 7' of adjacent links 3'. Each connector 50 has a substantial dimension lengthwise of the belt to provide for laterally extending long and short leading and trailing extensions 51 and 53. Note in FIG. 9 that the connectors 50 overlie the links 3' so that the latter for the most part are represented by dotted lines except for portions exposed by breaking away part of one connector. Note also that the members of each group of fasteners 15' are located toward one end of a connector 50.

The short extensions 51 carry rollers 55 and the long extensions 53 carry rollers 57. Side plates corresponding to side plates 39 in FIGS. 5–7 are numbered 39' in FIGS. 8–10. In these are grooves 59 which are deep enough to accept the rollers 57 on the longer extensions 53 and also the rollers 55 on the shorter extensions 51. The deep grooves 59 are straight until they reach a point as shown at 61 in FIG. 11. Here each continues as an outer circular branch 63. A shallow branch of groove 59 continues as a straight portion 65 and then as an inner circular portion 67. Thus as the rollers 55 approach the drum they can and do continue on into the shallow inner circular branch groove 67; whereas the rollers 57, not being able to continue into the shallow groove part 65, are switched into the deep outer circular branch groove 63. The purpose of this arrangement is positively to hold the connectors 50 against oscillations from tangent positions relative to drum 1', as illustrated at P' in FIG. 8.

It is to be noted that the fasteners 15' between the fingers 5' and the tongues 7' are offset with respect to the center portions of the connectors 50 which accounts for the apparently unsymmetrical positions assumed by the connectors 50 relative to drum 1' (FIG. 8). On the other hand, the absence of bending stresses at the fasteners 15' between connectors 50 and the distal ends of fingers 5' and 7' are the same as in the case of the corresponding parts 13, 5 and 7 of FIGS. 1–7. The difference is that no oscillations of connectors 50 can occur on the drum 1'. The distance D is shown on FIGS. 8–10.

In the operation of the FIGS. 8–11 form of the invention the rollers 55 and 57 follow the deep groove 59 in the reaches of the belt between drums. This carries the links 3' in a plane until a drum such as 1' is reached. At this point rollers 55 continue into the inner circular groove 67 whereas the outer rollers 57 are switched into the outer circular groove 63. This holds the connectors 50 in the tangent positions P' shown in FIG. 8.

Figure 12:
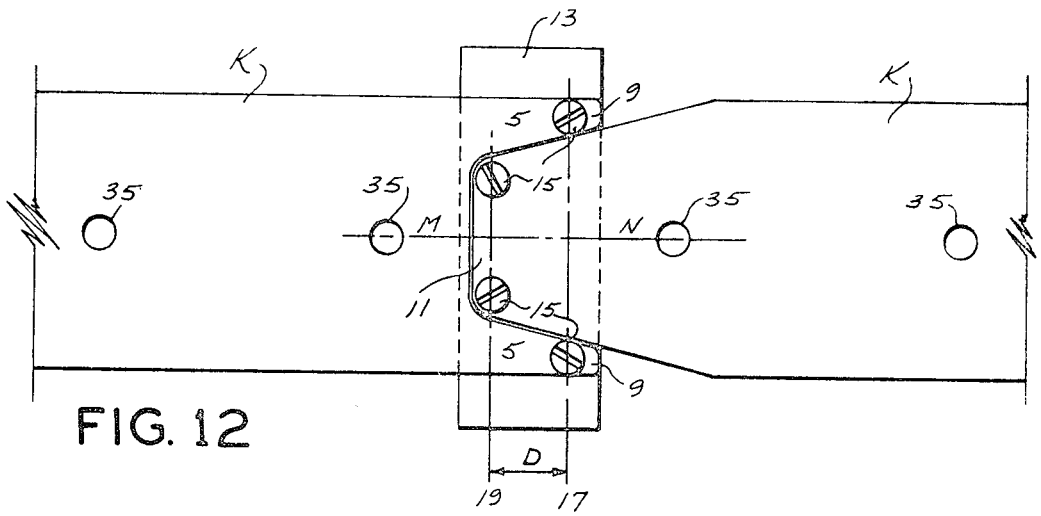
FIG. 12 is a view similar to FIG. 1 showing a third form of the invention.

Referring to FIG. 12, it shows a belt composed, not of a plurality of links as in FIGS. 1–7 or 8–11, but one in which the belt (lettered K) is made of one continuous strip of flexible material having adjacent ends formed like the adjacent ends of the links in said FIGS. 1–11. Thus in FIG. 12 these ends are joined by connectors 13 the same as in FIGS. 1–7 which are fastened by means of fasteners 15 to the distal ends 9 of fingers 5 at one end of the belt and to a distal end 11 of the tongue 7 at the other end of the belt K. The action on a drum of this arrangement is similar to that already described in connection with any one of the connectors 13 of FIGS. 1–7. The belt K has holes 35 in it corresponding to the holes 35 for registration with the dowel pins 33 on drum 1 of FIGS. 1–7. It is of course obvious that in any case such holes could be eliminated if the dowels 33 were eliminated from the drum 1 for nonpositive driving operations. In such cases peripheral grooves on the driving drum would be used to accommodate fastener heads such as 21.

Figure 13:
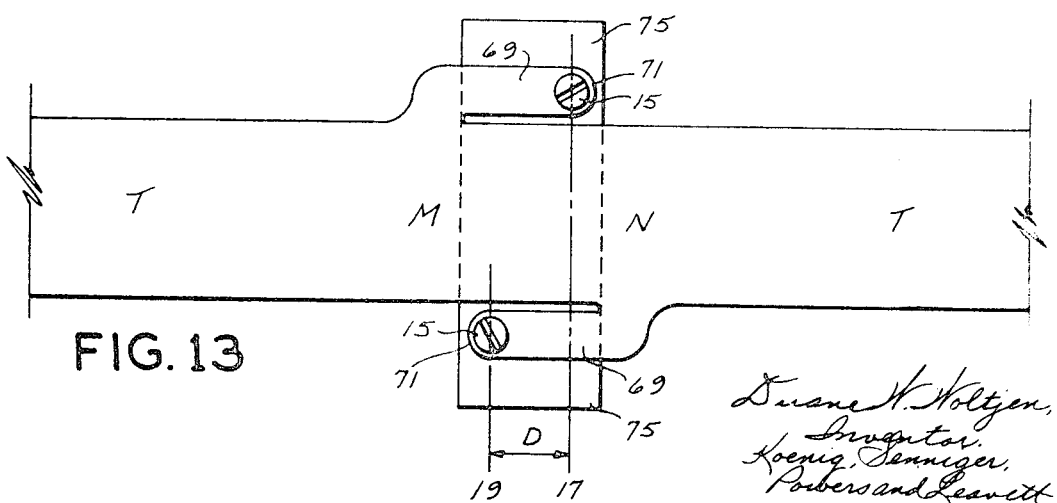
FIG. 13 is a view similar to FIG. 1 showing a fourth form of the invention.

In FIG. 13 is shown a form of the invention in which the flexible belt is of one piece and endless. It is lettered T. Extending from its opposite sides are L-shaped fingers 69 which interdigitate in a direction along the length of the belt and in its plane when flat. The distal ends 71 of these fingers are thus spaced from one another in direction along the belt length. Fasteners 15, like those of FIG. 3, attach the distal ends 71 to an appropriate rigid connector 75. Thus as the portions of the belt under the connector 75 engage a circular drum, the distal ends 71 of the interdigitating fingers 69 lie in a common plane which is substantially tangent to the drum surface.

From the above it will be apparent that in each form of the invention (FIGS. 1, 9, 12 and 13) there are adjacent flexible sheetlike portions such as M and N in the belt which are joined by a rigid connector, these sheetlike portions being shaped with projections which interdigitate in the plane of the belt when flat but can freely assume positions in another plane when the belt is fitted around a cylinder. In such other positions the projections are held in a plane substantially tangent to the cylinder by the rigid connector. The line of tangency may lie anywhere in the span D. In the FIG. 13 form the portions M and N are parts of one undivided sheet; whereas corresponding portions in the forms of FIGS. 1–12 are divided. In the forms of FIGS. 1–7, 12 and 13 the angular locus of the tangent plane may vary under any angular vibration of the connector; whereas the FIGS. 8–11 form this is not the case, because the circular grooves 63 and 67 positively determine the angular locus of the connector and of the tangent plane.

It will be seen that in all forms of the invention the belt parts with the exception of the connectors are ribbonlike and that their forms can be conveniently made by shearing or the like. It will also be apparent that weldments may be substituted for the screw fasteners 15 and that the follower rollers 55 and 57 may be omitted and nonrotary finger followers used. Holes such as 35 and pins such as 33 may be employed or omitted from any form of the invention. Also, other appropriate numbers of interdigitating fingers and tongues such as 9 and 11 may be employed.

In conclusion, certain of the basic features of the invention are presented in exaggerated form in the skeleton diagram of FIG. 14. This shows a drum such as 1 or the like on which are wrapped adjacent portions such as M and N of flexible belt-forming material having interdigitated extensions 5 and 7, the distal ends 9 and 11 of which are maintained in a common plane P—P by a rigid connector 3 attached thereto at fasteners 15 and spaced apart the distance D. From the FIG. 15 it is clear that the connector 13 is normally resiliently held in the position shown and that the material at locations of fasteners 15 is free of any bending. Under light weights of connectors 13 and their loads, the tangent point 0 normally takes up a position bisecting D but, as the connector oscillates somewhat, this point O may deviate some from the bisecting position without arriving closely enough near either of the points of fastening 15 to result in any substantial bending stresses thereat. Under heavier weights of connectors 13 and their loads (as in FIGS. 8–10) the guides such as 63 and 67 prevent excessive oscillations so that the position of O bisecting D is positively maintained.

In the link form of the invention (FIG. 1) in which the belt is composed preferably of a number of precision die blanked links (holes included in the blanking) it is important that the belt shall remain straight in the reaches between drums, which is to say that it shall not assume a camber transverse to the belt center line C—C. Such a camber may occur if the blanked pairs of holes in the links 3 and/or if jig-drilled holes in the connectors 13 are not exactly collinear on the perpendicularly transverse lines 17 and 19, as may occur even with precision blanking and jigging. Any resulting small repetitive errors in blanking and jig drilling become cumulative on one side or the other of the belt to bring about said camber. Upon assembly, this is avoided by turning over every other one of commonly blanked links 3 oppositely with respect to the center line C—C. Likewise any contribution to camber occurring because of repetitive jig drilling errors in the connectors 13, upon assembly is corrected by turning over every other connector oppositely with respect to the center line C—C. To this end opposite faces of all connectors 13 are made plane and parallel as shown in FIGS. 1 and 2 so that in either position they present like inner faces contacting the links and like outer faces for fastening workpieces thereto.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A belt drive mechanism comprising spaced sidewalls, a driving drum and an idler drum mounted for rotation between the walls, a flexible belt having at least one pair of adjacent flexible sheet portions, at least one extension from each of said adjacent portions projecting oppositely to one another in the direction of the belt length to interdigitate the extensions in a plane when the belt is flat thereby to space the ends of the extensions in the direction of the belt length, at least one rigid connector, rigid fastening means between said connector and said ends of the extensions respectively, guide grooves on the insides of said walls having straight portions between the drums and branched circular outer and inner portions at the ends of the drums, transversely projecting leading and trailing follower members on the connector extending into said grooves for joint movements in the straight portion and for individual movements in the branched circular portions respectively, and means for guiding the leading follower means into the inner circular groove and for switching the trailing follower means into the outer circular groove.

2. A belt drive mechanism according to claim 1 wherein said switching means comprises a comparatively large depth of said straight groove and said circular outer branch portion and a smaller depth of said circular inner branch portion with the projections of the leading and trailing follower members being comparatively short and long respectively, only the inner circular branched groove admitting the leading follower members.

3. A flexible belt mechanism comprising,
   a connected series of adjacent links, each link having at least one extension from each end, each extension having a distal end region, the extensions on adjacent links projecting oppositely in a straight configuration of the belt, thereby to interdigitate such extensions and to space said distal end regions in the direction of the belt length,
   each link, including its extensions and their distal end regions, being flexible, integral and normally substantially flat,
   a plurality of rigid connectors,
   and rigid fastening means between each connector and the distal end regions of a pair of the interdigitated extensions,
   whereby said connectors will maintain said distal end regions substantially in a tangent plane outside of and tangent to said belt when it is in an arcuate configuration, thereby to avoid bending of the distal end portions at said fastenings,
   a pair of drums supporting said connected series of links around the drums with straight reaches of the links therebetween,
   a sidewall adjacent each side of the series and adjacent each end of at least one drum,
   opposite and like grooves in said walls,
   short leading and long trailing followers extending transversely from each link movable in said grooves,
   each of said grooves having comparatively deep straight portions along said reaches for receiving said short and long followers and having an inner shallow circular branch around each drum admitting short leading followers but not long trailing followers, and having an outer deep circular branch around each drum to admit a long trailing follower incapable of entering said inner circular branch,
   whereby oscillations of said distal end regions with respect to said tangent plane are prevented.

4. A belt drive mechanism comprising spaced side members, a driving drum and a second drum mounted for rotation between the members, a flexible belt having at least one pair of adjacent flexible sheet portions, at least one extension from each of said adjacent portions projecting oppositely to one another in the direction of the belt length to interdigitate the extensions in a plane when the belt is flat thereby to space the ends of the extensions in the direction of the belt length, at least one rigid connector, rigid fastening means between said connector and said ends of the extensions respectively, guide grooves on the insides of said side members having portions extending between the drums and branched curved outer and inner portions at the ends of the drums, transversely projecting leading and trailing follower members on the connector extending into said grooves for joint movements in the portions of the grooves between the drums and for individual movements in the branched curved portions respectively, and switching means for directing the leading follower means into the inner curved groove and for directing the trailing follower means into the outer curved groove.

5. A belt drive according to claim 4 wherein said switching means comprises a comparatively large depth of the grooves between drums and said curved outer branch portion and a smaller depth of said curved inner branch portion with the projections of the leading and trailing follower members being comparatively short and long respectively, only the inner curved branched groove admitting the leading follower members and only the outer curved branched groove admitting the trailing follower means.

6. A belt drive according to claim 5 wherein said portions of the grooves between the drums are straight and said curved inner and outer branch portions of the grooves are substantially circular.

7. A flexible belt mechanism comprising,
a connected series of adjacent links, each link having at least one extension from each end, each extension having a distal end region, the extensions on adjacent links projecting oppositely in a straight configuration of the belt, thereby to interdigitate such extensions and to space said distal end regions in the direction of the belt length,
each link, including its extensions and their distal end regions, being flexible, integral and normally substantially flat,
a plurality of rigid connectors,
and rigid fastening means between each connector and the distal end regions of a pair of the interdigitated extensions,
whereby said connectors will maintain said distal end regions substantially in a tangent plane outside of and tangent to said belt when it is in an arcuate configuration, thereby to avoid bending of the distal end portions at said fastenings, followers but not the long trailing followers, and having an outer deep circular branch around each drum to admit a long trailing follower incapable of entering said inner circular branch,
whereby oscillations of said distal end regions with respect to said tangent plane are prevented.

* * * * *

PO-1050 (5/69)

UNITED STATES PATENT OFFICE
CERTIFICATE OF CORRECTION

Patent No. 3,636,783      Dated January 25, 1972

Inventor(s) Duane W. Woltjen

It is certified that error appears in the above-identified patent and that said Letters Patent are hereby corrected as shown below:

Column 2, line 55, "link 19." should read -- line 19. -- .
Column 8, line 16, cancel "followers but not the long trailing followers,"; Cancel lines 17-19 and insert:

-- a pair of drums supporting said connected series of links around the drums with straight reaches of the links therebetween, a side member adjacent each side of the series and adjacent each end of at least one drum, opposite and like grooves in said side members, comparatively short leading and long trailing followers extending transversely from each link movable in said grooves, each of said grooves having comparatively deep straight portions along said reaches for receiving said short and long followers and having an inner shallow circular branch around each drum admitting the short leading followers but not the long trailing followers, and having an outer deep circular branch around each drum to admit a long trailing follower incapable of entering said inner circular branch, --.

Signed and sealed this 26th day of September 1972.

(SEAL)
Attest:

EDWARD M. FLETCHER, JR.
Attesting Officer

ROBERT GOTTSCHALK
Commissioner of Patents